… … …

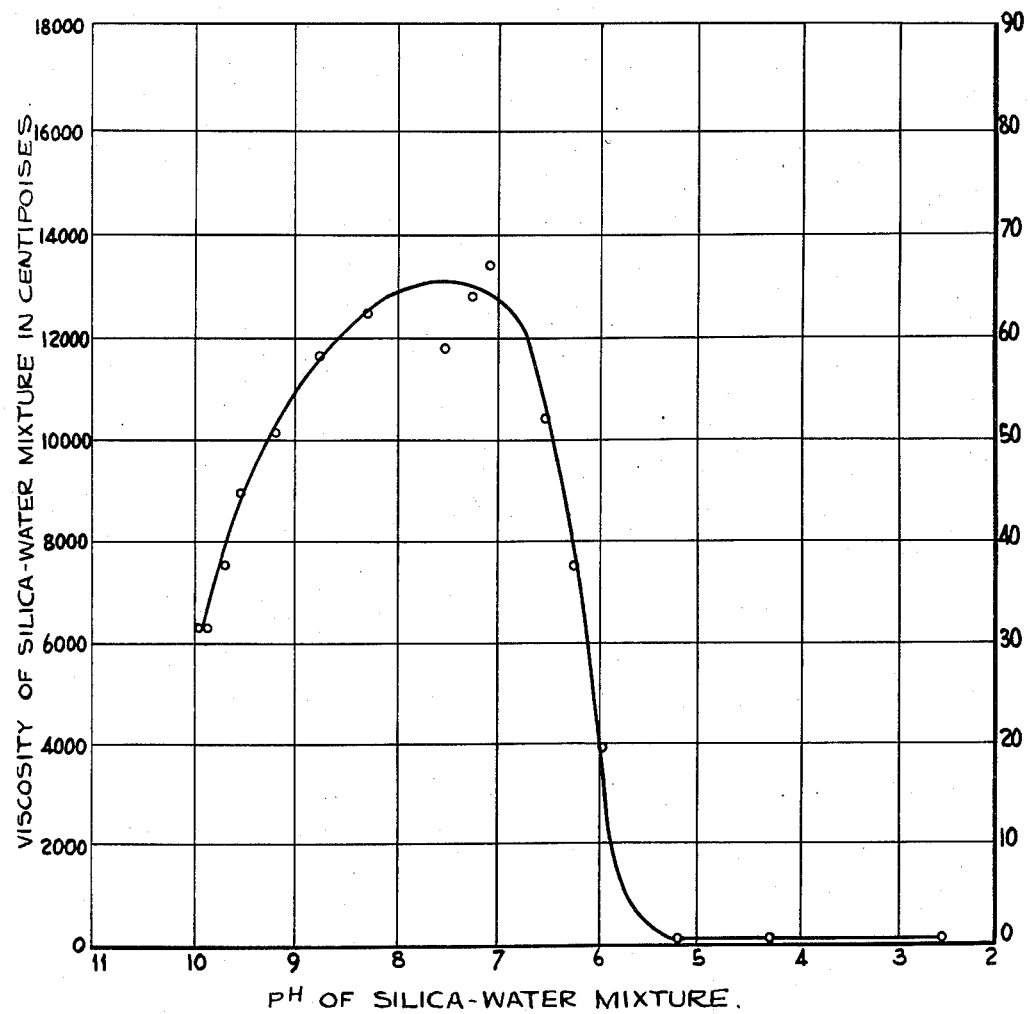

United States Patent Office 2,863,727
Patented Dec. 9, 1958

2,863,727
TREATMENT OF SILICA

Fred S. Thornhill, Bourg-la-Reine, France, and James E. Morgan, Barberton, Ohio, assignors to Columbia-Southern Chemical Corporation, Allegheny County, Pa., a corporation of Delaware Application January 28, 1957, Serial No. 636,816

4 Claims. (Cl. 23—182)

This invention relates to a novel method of treating silica slurries containing finely divided silica in a filterable form. It is known that silica may be precipitated in the form of finely divided discrete particles which are readily filterable and which may be recovered from the slurry by settling or filtration. Such slurries normally have a surface area of 25 to 400 square meters per gram, preferably in the range of 25 to 200 square meters per gram. They normally have an average ultimate particle size below 0.1 micron, usually in the range of 0.01 to 0.05 micron. In many cases the particles are present as flocs or porous aggregates of ultimate particles. Thus, the particle size of the flocs is about 1 to 10 microns, 40 percent or more being about 2 to 6 microns. Small amounts of metals such as calcium or like alkaline earth metal or sodium or like alkali meta, iron, aluminum, etc. also may be present in the silica.

Typical slurrries of this type are produced according to methods described in the application of Edward M. Allen, Serial No. 283,721, filed April 22, 1952, upon which United States Letters Patent No. 2,805,955 was granted on September 10, 1957, such as by extraction of calcium from finely divided calcium silicate by means of an acid such as hydrochloric acid. Such silicas also may be prepared by direct addition of an acid, such as carbon dioxide, to sodium silicate under controlled conditions as specifically described and claimed in the application of Fred S. Thornhill, Serial No. 533,043, filed August 23, 1955. Such slurries normally contain about 2 to 8 percent of solids by weight.

In the recovery of silica of this character, considerable difficulty is encountered because of the extreme fineness of the product. That is, silica filters only very slowly. This makes the process expensive because of the large amount of filtration equipment which is required. Furthermore, the filter cake frequently contains a very appreciable amount of water. The filter cake usually consists of about 10 to 20 percent (or even higher where the particle size of the silica is larger) of solids, the balance largely being water.

According to the present invention, an improved method of obtaining a fluid slurry of silica has been provided. In the practice of this process, a slurry of silica is filtered while the slurry is alkaline or at least is low in acidity. Thereafter, the resulting filter cake which contains a very substantial amount of water and at least about 12 percent by weight of siliceous solids (silica, hydrated silica, and the like) is treated to increase the acidity thereof without reducing the solids content of the acidified product below about 12 percent by weight. According to this invention it has been found that this filter cake may be converted to an essentially fluid state simply by reducing the pH thereof even if no water or other liquid is added.

The exact pH at which the filtration should be conducted is capable of some variation so long as the slurry is not highly acid. Generally speaking, the siliceous filter cake produced by filtration of a silica slurry has a pH about one pH unit higher than that of the slurry which produces the cake. For example, a slurry having a pH of 5.7 produces a filter cake having a pH of about 7 when it is reslurried in 100–150 milliliters of water.

As a general rule, when the filter cake which is produced as herein contemplated is slurried in 100–150 milliliters of distilled water, the slurry thus obtained should have a pH above 6, i. e., in the range of 5.75 or above. Such a filter cake can be obtained by filtration of a slurry having a pH one unit lower, i. e., about 5 or above.

The fluidity of the resultant filter cake can be substantially increased simply by adjusting the pH thereof below about 6, i. e., 5.75 or below. The accompanying drawing illustrates the change in viscosity of the silica-water mixture with change in pH and shows that substantial changes take place in the range of 5.5 to 6.5. This drawing illustrates the data determined according to Example II below by pH adjustment of a filter cake produced by filtration of a silica slurry produced substantially as described below in Example I.

The relatively thin slurry produced by reducing the pH of the filter cake as herein contemplated may be treated by any convenient method to remove water therefrom or it may be subjected to high shear agitation in order to produce a relatively stable thin slurry or sol of silica.

For example, it may be spray dried. Alternatively, it may be filtered and the resulting filter cake may be dried by convenient methods. According to a further embodiment, the thin slurry or the filter cake produced by filtration thereof may be dried azeotropically by use of organic liquids which assist the distillation of water therefrom. In any case, a very finely divided product is obtained and a simple means is provided whereby a large amount of water may be removed while the pH of the slurry is above 5, thereby producing a filter cake having a pH of 5.75 to 6 or above, and containing at least about 12 percent by weight of solids, and the resulting filter cake may be processed in a simple manner by acidification to a pH below about 6, for example, 5.75 or below.

In the performance of the process herein contemplated, silica slurries such as are prepared according to the methods described in the above mentioned applications of Allen and Thornhill are treated although it is to be understood that the silica slurries may be prepared by other processes. These silica slurries usually contain appreciable amounts of salt, for example, when calcium silicate is acidified with hydrochloric acid, the slurry contains an appreciable amount of calcium chloride. Likewise, when the slurries are prepared by acidification of sodium silicate, a substantial amount of sodium salt will be present. Normally, this is removed by washing. Thus, the silica slurries may be filtered, repulped, and washed according to conventional methods.

The chemical composition of the slurry depends to a considerable degree upon the method by which it has been produced. If sufficiently washed and extracted, the slurry contains only hydrated and/or unhydrated silica. More often, however, it is associated to some degree with certain cations which appear to be in chemical combination. Thus, the silica may contain an alkaline earth metal such as calcium, magnesium or the like in the proportion of one mole of the oxide thereof per 10 to 350 moles of $SiO_2$ and/or $Al_2O_3$ in the proportion of one mole of $Al_2O_3$ per 15 to 300 moles of $SiO_2$. The $SiO_2$ content of the solids in the slurry normally exceeds 80 to 85 percent by weight of $SiO_2$ on the anhydrous basis (free of combined and free water). Other metallic cations such as iron, zinc, and the like, also may be present.

As has been described and claimed in the above mentioned Thornhill application, it is frequently desirable to stabilize the surface area of the silica prior to subjection to further treatment. In such a case, the silica is precipitated and acid addition is interrupted before the pH of the slurry can fall below 5. Thereafter, the slurry is boiled, or at least the silica in aqueous suspension is boiled, in order to stabilize the surface area. If this precaution is not observed, the surface area materially changes upon further acidification. Heat treatment may be effected by heating the silica at a temperature above 60° C. for a period of 30 or more minutes. Usually, it is effected by heating to approximately boiling temperature, generally in the range of 80 to 100° C. for this period of time.

At all events, the silica slurry, with or without the heat treatment, extraction to remove cations or the like, is adjusted to a pH above about 5, preferably above 6, and is filtered. The resulting filter cake usually contains at least about 12 to 20 percent by weight of solids, the balance being water. The exact amount of water in the filter cake varies depending upon the character of the silica, the amount of suction on the filter cake, and the like. The acidification may be effected with any convenient water soluble acid or acidic material which produces a pH below 5.75 in aqueous solution.

Typical materials which are suitable include cation exchange resins in the hydrogen form. Among these resins are those produced by sulphonation of polystyrene and copolymers of styrene with divinyl benzene. See, for example, U. S. Patents Nos. 2,366,077, 2,631,127, etc. These resins normally are in granular form. They are convenient since they contain little water and therefore do not result in introduction of water into the system. Moreover, they do not introduce a foreign anion into the system since the resin which constitutes the anion in combination with hydrogen ion is insoluble in water.

Various other acidic materials may be used to reduce the pH of the filter cake below 5.5. These include hydrochloric acid or hydrogen chloride gas, nitric acid, sulphuric acid, sulphur dioxide, sulphur trioxide, acetic acid, tartaric acid, oxalic acid, phthalic acid, sulphurous acid, orthophosphoric acid, citric acid, carbonic acid, and the like. Other materials having acidic reaction, such as salts, may be used for this purpose. These include aluminum sulphate, ammonium chloride, ammonium sulphate, and like materials having an acid reaction in aqueous media.

A further method of acidification is to add to the filter cake a quantity of silica which itself is acidic. Thus, silica prepared by drying an acidic slurry may be used to adjust the pH of the filter cake with or without addition of water.

The acidification is effected without excessive dilution of the filter cake with water and in fact can be effected without any addition of water. While it is unnecessary to avoid addition of any water, the amount of water added generally should be less than that which would disperse the silica to form a slurry without acid addition. Usually, the slurries produced should contain at least about 12 to 15 percent or more of solids.

As a consequence of the acidification, the filter cake thins out and becomes fluid. This fluid may be spray dried to produce directly a finely divided silica. Alternatively, the fluid may be filtered in order to remove further water and thereafter the resultant filter cake may be dried according to standard methods.

Moreover, the residual water from the resulting fluid may be removed by azeotropic distillation with organic liquids or the fluid may be filtered and the water may be removed from the filter cake by azeotropic distillation. Alternatively, the resulting slurry may be milled or homogenized to produce a stable silica sol or suspension.

The following example is illustrative:

EXAMPLE I

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. It contains no sodium chloride except the minor amount (less than 0.08 percent by weight) usually present in commercial sodium silicate. The solution is held at a temperature of 167° F. plus or minus 5°. Carbon dioxide gas containing 10.0 to 10.8 percent by volume of carbon dioxide, the balance being nitrogen and air, is introduced into the solution at a gas temperature of 115 to 145° F. at a rate sufficient to provide 1250 cubic feet of the carbon dioxide gas per minute, measured at 760 millimeters' pressure and 0° C. This gas introduced directly into a turbo-agitator in a manner to achieve uniform distribution of the gas and the mixture is vigorously agitated. Carbon dioxide introduction is continued at this rate for 8½ hours, at which time about 120 to 140 percent of the theoretical amount of carbon dioxide required to react with sodium silicate to produce $NaCO_3$ has been absorbed. After this period of 8½ hours, the rate of introduction of carbon dioxide is reduced to 400 cubic feet per minute and the solution is boiled for 1½ hours. The resulting silica has a surface area of about 140 to 150 square meters per gram and is in the form of flocs of particles having an average ultimate particle size of about 0.02 to 0.03 micron and is in the form of flocs of a plurality of such ultimate particles.

The resulting slurry is placed in a Dorr thickener and enough aluminum sulphate is added to give a content of 2 to 4 percent by weight of $Al_2O_3$, based upon the silica in the slurry. The product is then thickened by conventional decantation, filtered and repulped in water to about 10 percent by weight of solids. Enough hydrochloric acid is added to bring the pH of the slurry to 5.7 and the slurry is filtered.

The wet filter cake contains about 17 percent by weight of solids. This filter cake is acidified by stirring with enough hydrochloric acid to reduce the pH thereof to about 2 or 3 and adding enough water to reduce the solids content to 15 percent by weight. A thin slurry, which can be sprayed dried or filtered, is produced.

The following example illustrates the rapid change in the viscosity of a silica-water mixture with change in pH:

EXAMPLE II

The silica treated in this example was prepared substantially by the process of Example I except that the rate of introduction of $CO_2$ was such that the time for introducing the theoretical amount of $CO_2$ was 4 hours, and carbon dioxide was introduced at this rate for 5 hours. Five hundred grams of the separated wet filter cake containing 14.5 percent by weight of this silica in water was placed in a beaker and the viscosity determined at 30° C. A 5-milliliter portion of the wet filter cake was then removed, diluted to 150 milliliters with water, and the pH of the diluted portion was measured.

Three grams of a solid dry cation exchange resin in the hydrogen form, "Amberlite IR–120," was added to the separated wet filter cake remaining in the beaker and mixed therewith using a spatula, and the viscosity and pH of the resulting slurry measured. This process was repeated a number of times. The results are as follows:

*Table I*

| Grams of resin added | pH of wet filter cake or resulting slurry after resin addition | Viscosity of the wet filter cake or resulting slurry after resin addition, Centipoises |
|---|---|---|
| 0 | 9.95 | 6,240 |
| 3 | 9.90 | 6,240 |
| 6 | 9.72 | 7,520 |
| 9 | 9.52 | 8,840 |
| 12 | 9.15 | 10,080 |
| 15 | 8.81 | 11,760 |
| 18 | 8.20 | 12,400 |
| 21 | 7.50 | 11,840 |
| 24 | 7.25 | 12,840 |
| 27 | 7.00 | 13,400 |
| 30 | 6.50 | 10,320 |
| 33 | 6.25 | 7,480 |
| 36 | 5.95 | 3,920 |
| 39 | 5.20 | 72 |
| 42 | 4.30 | 32 |
| 45 | 2.60 | 28 |

Note that a very sharp reduction in viscosity took place at a pH between 6.25 and 5.2.

EXAMPLE III

Silica is precipitated and boiled as in Example I and is washed twice with water and then the product is repulped and acidified to a pH of 2 to 3 with sulphuric acid. Enough sodium carbonate is added to the slurry to adjust the pH thereof to about 5 to 6. This product is washed four times by filtering and repulping the filter cake in water and the final slurry is filtered. The filter cake is then acidified to a pH of 2 to 3 using only enough water to adjust the solids content of the resulting slurry to 15 percent by weight. A thin slurry is produced which is spray dried or filtered.

EXAMPLE IV

Sixteen hundred gallons of a slurry of silica precipitated and boiled as in Example I and containing about 10 percent solids is acidified to a pH of 5.65 with hydrochloric acid and is digested for one-half hour. Thereupon, 12 pounds of calcium hydroxide slurried in a small amount of water is added and the pH of the resulting slurry is 6.5. This slurry is filtered. The filter cake is acidified to form a slurry containing 15 percent solids and having a pH of 2.

EXAMPLE V

A sodium silicate solution containing sodium silicate $Na_2O.(SiO_2)_{3.3}$ in an amount sufficient to establish an $Na_2O$ content of 20.3 grams per liter and also containing 17.6 grams per liter of NaCl was placed in a tank. A kiln gas mixture containing 40 percent $CO_2$, the balance being largely nitrogen, was introduced at a uniform rate into the mixture while holding the temperature of the mixture at 30° C. The carbon dioxide absorbed in the first 3.5 hours was the amount stoichiometrically required to neutralize the $Na_2O$ in the solution. Carbonation was continued at this rate for 4.5 hours.

The resulting slurry was boiled, filtered, and repulped, and the repulped slurry acidified with hydrochloric acid and aluminum sulphate to a slurry pH of about 7.2. The amount of aluminum sulphate added was enough to establish an $Al_2O_3$ content of 1.54 percent by weight on the basis of the anhydrous product.

The resulting slurry was filtered. Because the resulting filter cake was cracked and still contained a removable amount of water, 200 grams of this filter cake was mixed with 2 milliliters of water and the mixture refiltered. The new filter cake weighed 142.9 grams, thus showing that 58 milliliters of water was removed.

The resulting filter cake was acidified with 2 milliliters of nitric acid to a pH of 3, stirred thoroughly, and again filtered. This filter cake thus obtained weighed 118.2 grams, thus showing a further removal of 26 milliliters of water.

The pH of the slurries herein contemplated may be determined readily by mixing 5 grams of the silica with 100 grams of distilled water, adding 5 drops of saturated potassium chloride solution and measuring the pH of the slurry with a glass electrode in the conventional way.

EXAMPLE VI

Seventeen thousand gallons of a sodium silicate solution is placed in a 50,000-gallon tank. This solution contains the sodium silicate $Na_2O(SiO_2)_{3.3}$ in amount sufficient to establish an $Na_2O$ concentration of 20.3 grams per liter. It contains no sodium chloride except the minor amount (less than 0.08 percent by weight) usually present in commercial sodium silicate. The solution is held at a temperature of 167° F. plus or minus 5°. Carbon dioxide gas containing 10.0 to 10.8 percent by volume of carbon dioxide, the balance being nitrogen and air, is introduced into the solution at a gas temperature of 115 to 145° F. at a rate sufficient to provide 1250 cubic feet of the carbon dioxide gas per minute, measured at 760 millimeters pressure and 0° C. This gas is introduced directly into a turboagitator in a manner to achieve uniform distribution of the gas, and the mixture is vigorously agitated. Carbon dioxide introduction is continued at this rate for 8½ hours, at which time about 120 to 140 percent of the theoretical amount of carbon dioxide has been introduced. After this period of 8½ hours, the rate of introduction of carbon dioxide is reduced to 400 cubic feet per minute and the solution is boiled for 1½ hours. The resulting silica has a surface area of about 140 to 150 square meters per gram and is in the form of porous flocs of particles of the size discussed above.

The resulting silica slurry has a pH of about 9.9, is filtered, and the filter cake washed twice with water. The final filter cake contains about 16–17 percent by weight of solids. A sulphonated polystyrene cation exchanger in the acid form having a particle size of 16 to 70 mesh is mixed with the filter cake in the proportion of 5 grams of filter cake per gram of resin. Enough water is added to reduce the silica solids content to about 15 percent by weight on the basis of the silica and water in the mixture. Upon stirring, the mixture thinned out to a fluid slurry. The resin was allowed to settle out and the slurry having a pH of about 2.0 was spray-dried. The resulting silica contained 0.1 percent CaO and 0.55 percent $R_2O_3$ by weight.

EXAMPLE VII

Three thousand milliliters of silica slurry containing 16.97 percent of solids and prepared as in Example VI and washed twice with water was placed in an Eppenbach mixer under conditions which effectively homogenized the silica. The product was mixed with 800 grams of Amberlite IR–112, a commercial sulphonated polystyrene cation exchange resin having a particle size of 16 to 70 mesh. The resin was separated and the silica slurry found to contain only 0.19 gram per liter of sodium and 0.14 gram per liter of CaO. The slurry initially treated contained 4.47 grams per liter of sodium and 0.3 gram per liter of CaO.

EXAMPLE VIII

Silica prepared as in Example II was washed and filtered. One hundred gram portions of the filter cake were placed in 400-milliliter beakers and mixed with small portions of the acidic material set forth in the table below by mixing with a spatula. Thereafter, the mixture was filtered and the pH and volume of the filtrate were measured. The results were as follows:

*Table II*

| Additive to 100 gram portion of filter cake | Milliliter of water in filtrate | pH of filtrate |
|---|---|---|
| 4 milliliters of water | 15.5 | 6.4 |
| 4 milliliters of acetic acid | 24.5 | 2.8 |
| 4 grams of adipic acid | 28.0 | 3.3 |
| 4 grams of citric acid | 27.0 | 2.4 |
| 4 milliliters of nitric acid | 27.0 | 0.8 |
| 4 grams of $Al_2(SO_4)_3 18H_2O$ | 24.5 | 3.2 |
| 18.4 grams of $NH_4F.HF$ | 37.0 | |

In most of the above examples it will be noted that the pH of the slurry is reduced to about 2 to 3. While the increase in fluidity can be achieved at higher levels of pH, as shown by Example II, it frequently is convenient to reduce the pH to about 2 to 3 or even below in order to ensure uniformity in operation from batch to batch and from day to day.

It will be understood that the above examples are typical of the performance of the present invention. Silicas prepared according to other methods, such as by the other methods set forth in the examples of the above mentioned applications, may be treated in a similar manner.

Although the present invention has been described with reference to the specific details of certain embodiments, it is not intended that such embodiments shall be This application is a continuation-in-part of our co-pending application Serial No. 376,224, filed August 24, 1953.

What is claimed:

1. A method of removing water from a silica slurry in a finely divided filterable form which comprises filtering the slurry while the pH thereof is above 5 to produce a filter cake containing at least 12 percent by weight of solids and thereby to produce a filter cake having a pH of at least 6, and adjusting the pH of the filter cake below 5.75 while maintaining the solids content of the resulting product at least 12 percent by weight and thereby producing a fluid slurry.

2. A method of removing water from a silica slurry which contains silica in a finely divided filterable form which comprises filtering the slurry while the pH thereof is above 5 to produce a filter cake containing at least 12 percent by weight of solids, adding sufficient acid to the filter cake to reduce the pH thereof to about 2 to 3 but insufficient to reduce the solids content thereof below 12 percent by weight, and thereby producing a fluid slurry.

3. A method of increasing the fluidity of a mechanically separated silica-water mixture having the consistency of a wet filter cake and containing at least 12 percent by weight of solids and having a pH of at least 6 which comprises reducing the pH thereof below 5.5 while maintaining the solids content thereof at least 12 percent by weight whereby to produce a fluid slurry.

4. The process of claim 3 wherein the silica has an average ultimate particle size below 0.1 micron.

References Cited in the file of this patent

UNITED STATES PATENTS

| | | |
|---|---|---|
| 2,114,123 | Heuser | Apr. 12, 1938 |
| 2,462,236 | Thomas | Feb. 22, 1949 |
| 2,588,853 | Kumins et al. | Mar. 11, 1952 |
| 2,686,731 | Wainer | Aug. 17, 1954 |

FOREIGN PATENTS

| | | |
|---|---|---|
| 299,483 | Great Britain | Oct. 29, 1928 |